United States Patent
Lee et al.

(10) Patent No.: US 8,233,879 B1
(45) Date of Patent: Jul. 31, 2012

(54) MOBILE DEVICE PERSONALIZATION BASED ON PREVIOUS MOBILE DEVICE USAGE

(75) Inventors: Wing K. Lee, Ashburn, VA (US); Dora Potluri, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 373 days.

(21) Appl. No.: 12/426,096

(22) Filed: Apr. 17, 2009

(51) Int. Cl.
*H04W 4/00* (2009.01)

(52) U.S. Cl. ............... 455/405; 455/419; 455/432.3; 455/414.1

(58) Field of Classification Search .......... 455/419, 455/432.3, 405, 414.1; 22/419, 432.3
See application file for complete search history.

(56) References Cited

U.S. PATENT DOCUMENTS

| | | |
|---|---|---|
| 6,249,252 B1 | 6/2001 | Dupray |
| 6,405,044 B1 | 6/2002 | Smith et al. |
| 6,449,486 B1 | 9/2002 | Rao |
| 6,505,046 B1 | 1/2003 | Baker |
| 6,760,582 B2 | 7/2004 | Gaal |
| 6,801,778 B2 | 10/2004 | Koorapaty et al. |
| 6,961,367 B2 | 11/2005 | Simic et al. |
| 7,092,722 B1 | 8/2006 | Oh et al. |
| 7,343,317 B2 | 3/2008 | Jokinen et al. |
| 7,376,430 B2 | 5/2008 | Matsuda |
| 7,400,884 B2 | 7/2008 | Fok et al. |
| 7,840,538 B2 | 11/2010 | Joshi et al. |
| 7,945,271 B1 | 5/2011 | Barnes et al. |
| 8,010,134 B2 | 8/2011 | Barnes et al. |
| 2002/0086680 A1 | 7/2002 | Hunzinger |
| 2003/0008668 A1 | 1/2003 | Perez-Breva et al. |
| 2003/0040850 A1 | 2/2003 | Najmi et al. |
| 2003/0065805 A1 | 4/2003 | Barnes, Jr. |
| 2004/0064447 A1 | 4/2004 | Simske et al. |
| 2004/0140361 A1 | 7/2004 | Paul et al. |
| 2004/0198386 A1 | 10/2004 | Dupray |
| 2004/0243519 A1 | 12/2004 | Perttila et al. |
| 2005/0102329 A1* | 5/2005 | Jiang et al. .............. 707/204 |
| 2005/0164704 A1* | 7/2005 | Winsor .............. 455/432.3 |
| 2005/0191998 A1* | 9/2005 | Onyon et al. .............. 455/419 |
| 2005/0192024 A1 | 9/2005 | Sheynblat |
| 2006/0089153 A1 | 4/2006 | Sheynblat |
| 2006/0178932 A1 | 8/2006 | Lang |
| 2006/0183469 A1* | 8/2006 | Gadson .............. 455/419 |
| 2007/0161380 A1 | 7/2007 | Fok et al. |
| 2007/0239671 A1 | 10/2007 | Whitman et al. |
| 2008/0010114 A1 | 1/2008 | Head |
| 2008/0066080 A1 | 3/2008 | Campbell |
| 2008/0119206 A1 | 5/2008 | Shalmon et al. |
| 2008/0305795 A1 | 12/2008 | Murakami et al. |

OTHER PUBLICATIONS

Lee, Wing K., et al., "Mobile Device Search Optimizer," U.S. Appl. No. 12/426,089, filed Apr. 17, 2009.
Lightningcast, Inc., "Lightningcast Mobile Video Advertising Solution," May 2, 2005.
Office Action dated May 9, 2011, U.S. Appl. No. 12/426,089, filed Apr. 17, 2009.
Final Office Action dated Sep. 14, 2011, U.S. Appl. No. 12/426,089, filed Apr. 17, 2009.
Advisory Action dated Nov. 25, 2011, U.S. Appl. No. 12/426,089, filed Apr. 17, 2009.
Office Action dated Apr. 10, 2012, U.S. Appl. No. 12/426,089, filed on Apr. 17, 2009.

* cited by examiner

*Primary Examiner* — Pierre-Louis Desir

(57) ABSTRACT

A system for personalizing new mobile devices based on previous mobile device usage is provided. The system includes a storage device, a processor, and a personalizing engine. The personalizing engine, when executed by the processor, stores user input for a first mobile device to the storage device, and builds a profile based on the user input. The personalizing engine also configures a user interface on a second mobile device to provide a user interface link based on the profile to enable a user to access the user interface link via the second mobile device.

17 Claims, 3 Drawing Sheets

MOBILE DEVICE PERSONALIZATION BASED ON PREVIOUS MOBILE DEVICE USAGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A mobile device may be a mobile phone, a wireless handset, a pager, a personal digital assistant, or a gaming device. Mobile device users may replace their previous mobile device with a new mobile device due to the new mobile device's features. Furthermore, the cost of upgrading to a new mobile device with additional or improved features may not be much more than the cost to repair a previous mobile device.

SUMMARY OF THE INVENTION

In some embodiments, a system is provided for personalizing new mobile devices based on previous mobile device usage. The system includes a storage device, a processor, and a personalizing engine. The personalizing engine, when executed by the processor, stores user input for a first mobile device to the storage device and builds a profile based on the user input. The personalizing engine also configures a user interface on a second mobile device to provide a user interface link based on the profile to enable a user to access the user interface link via the second mobile device.

In some embodiments, a computer implemented method is provided for personalizing new mobile devices based on previous mobile device usage. User input for a first mobile device is stored to a storage device. A profile is built based on the user input. A user interface on a second mobile device is configured to provide a user interface link based on the profile to enable a user to access the user interface link via the second mobile device.

In some embodiments, a system is provided for personalizing new mobile devices based on previous mobile device usage. The system includes a storage device, a processor, and a personalizing engine. The personalizing engine, when executed by the processor, stores user input for a first mobile device to the storage device and builds a profile based on the user input. The personalizing engine also configures a user interface on a second mobile device to provide a modified order of access based on the profile to enable a user to access a resource via the second mobile device using the modified order of access.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
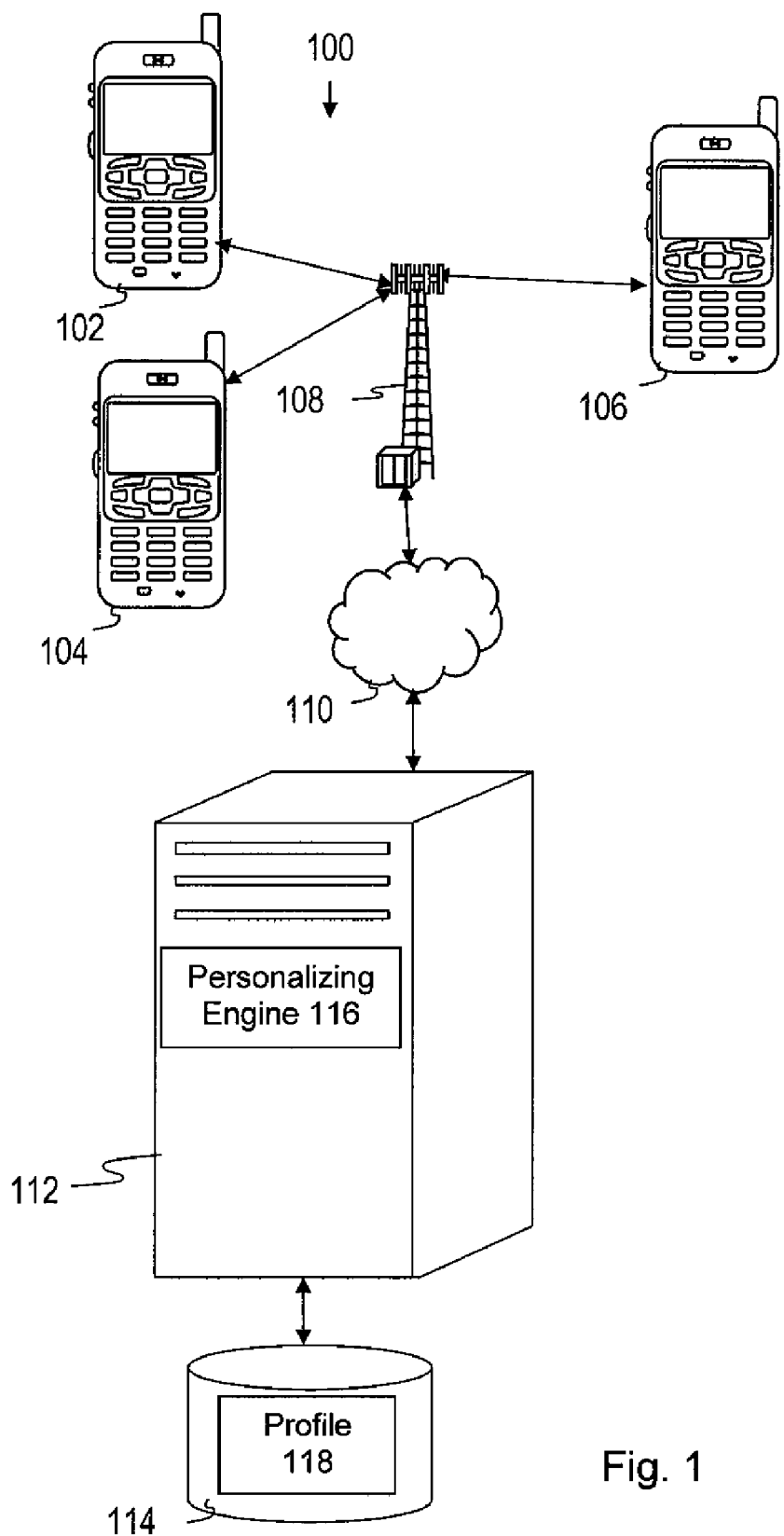
FIG. 1 illustrates a system for personalizing new mobile devices based on previous mobile device usage according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

When a mobile device user replaces their previous mobile device with a new mobile device, the user may not be familiar with all of the features offered by the new mobile device. Furthermore, the user may not have learned how to use all of the features offered by their previous mobile device by the time of the upgrade. Learning how to use their new mobile device features may become time consuming and frustrating for the user, which may lead to lower customer satisfaction.

In some embodiments, a system is provided for personalizing a new mobile device based on a previous mobile device usage. A personalizing engine stores user input for the user's previous mobile device to a storage device. For example, the user input to the previous mobile device via a user interface for a web browser to traverse a number of displayed web pages to display updated information about the user's favorite professional football team. In another example, the user input navigated a game selection page to select the user's favorite video game on the user's previous mobile device. The personalizing engine may store user input that indicates which functions were used on the previous mobile device, how often the functions were used, and the screen paths used to select the functions. Mobile device functions may include listening to music or a radio station, watching television, setting a timer or an alarm, conducting a search via a web site, communicating via voice mail, tracking a stock price quote, recording voice memos, receiving weather forecasts, and receiving directions for navigating to a street address. The personalizing engine builds a profile based on the user input, such as the user input to traverse web pages to view the updated information or to select the favorite game.

The personalizing engine configures a user interface on the user's new mobile device to provide a user interface link or a modified order of access based on the profile. A user interface link may be a link from content displayed on a screen to content that is not displayed on the screen. For example, a user interface link may be a selectable option on a first web page that displays a second web page when selected. In another example, a user interface link may be an added option on a list of displayed options that enables a user to select an option from a portion of the list that is not currently displayed. A modified order of access may be a list of selectable options that is displayed in a different order from the original or default order for the list. The user interface link or the modified order of access may enable the user to use the features on the new mobile device in a more efficient manner based on the usage of the previous mobile device. For example, the personalizing engine configures the user interface for the web browser on the new mobile device to add a user interface link to the web page that is displayed first. The user may select the added user interface link to view updated information about the user's favorite professional football team without the need to traverse numerous web pages to view this information. In another example, the personalizing engine configures the user interface for the game selection page on the new mobile device to list the games played most frequently on the previous mobile device first, such that the user does not have to navigate far on the game selection page to select their favorite games. The personalizing engine may also add user interface links that enable the user to more efficiently use the new mobile device's functions, such as listening to music, watching television, conducting a search via a web site, communicating via voice mail, receiving directions for navigating to a street address, etc. The personalizing engine may also send a message for the user interface to display to the user, wherein the message explains the added user interface link and/or the modified order of access to the user. Configuring the user's new mobile device to enable the user to use the new mobile device's features more efficiently may reduce the time required for the user to learn how to use the new features, reduce the user's frustration, and increase customer satisfaction.

Turning now to FIG. 1, a diagram of a system 100 for personalizing new mobile devices based on previous mobile device usage is depicted according to embodiments of the present disclosure. The system 100 includes a first mobile device 102, a second mobile device 104, a third mobile device 106, a base transceiver station 108, a communication network 110, a server 112, and a data store 114. The mobile devices 102-106 may communicate with the server 112 via the base transceiver station 108 and the communication network 110. In a situation in which a mobile device user is upgrading their mobile device, the first mobile device 102 may be referred to as the previous mobile device 102 and the second mobile device 104 may be referred to as the new mobile device 104.

The server 112 includes a personalizing engine 116. The server 112 communicates with the data store 114, which includes a profile 118. Although depicted separately, the server 112, the data store 114, and their functions may be combined together in any combination.

The personalizing engine 116 stores user input for the user's first mobile device 102 to the storage device 114. The user input may indicate which functions were used on the user's first mobile device 102, how often these functions were used, and the screen paths used to access these functions. For example, the personalizing engine 116 stores user input to the previous mobile device 102 via a user interface for a web browser to traverse a number of displayed web pages to display updated information about the user's favorite professional football team. In another example, the personalizing engine 116 stores the user input that navigated a game selection page to select the user's favorite video game on the previous mobile device 102.

The personalizing engine 116 builds the profile 118 based on the user input. For example, the profile 118 includes the user input for viewing the user's favorite professional football team and selecting the user's favorite video game. Other examples of user input include a subscription, a purchase, a text message, an e-mail, content downloaded, a response to an advertisement, a time associated with the request for the resource, a social circle selected, and a social circle communication. A social circle is an online community of people who share interests and/or activities, or who are interested in exploring the interests and activities of others. Many social circles are web based and provide a variety of ways for users to interact via social circle communications, such as e-mail and instant messages. The profile 118 may also include information about the user's geographic location, demographic information about the user, and user requests, such as the user's responses to survey questions. If the location information used is regional in nature, the personalizing engine 116 may use a mailing address specified for a customer service bill as the basis for the mobile device location. If the location information used is local in nature, each of the mobile devices 102-106 may determine its location by executing a location fix technology associated with one of a cell tower, a cell sector centroid, an advanced forward link trilateration, a global positioning system, and a hybrid location fix technology. The demographic information may include a customer service bill, a credit report, an income level, an education level, an occupation, and/or credit card information.

The personalizing engine 116 configures a user interface on the user's new mobile device 104 to provide a user interface link or a modified order of access based on the profile 118. The user interface link or the modified order of access may enable the user to use the features on the new mobile device 104 in a more efficient manner that may be based not only on the usage of the previous mobile device 102, but also based on the user's interests as indicated by the user's locations, the user's answers to surveys, and the user's demographics. For example, the personalizing engine 116 may configure the user interface for the web browser on the new mobile device 104 to add a user interface link to the first web page displayed. The added user interface link may include a uniform resource locator (URL) that enables the user to view updated information about the user's favorite professional football team without the need to traverse numerous web pages to view this information.

In another example, the personalizing engine 116 configures the user interface for the game selection page on the new mobile device 104 to list the games played most frequently on the previous mobile device 102 first, such that the user does not have to navigate much on the game selection page to select their favorite games. The user interface link may include a navigation element in a document that enables navigation to another section of the document or to another section of another document. For example, rather than rearranging the order of the game selection page, the personalizing engine 116 configures the user interface for the game selection page to add a navigation element displayed at the top of the game selection page for favorite games. The user interface responds to the selection of the navigation element by displaying the favorite games, whether the favorite games are listed further down the same game selection page or on another game selection page.

The personalizing engine 116 modifying the access orders and navigation elements may result in saving time for the user of the new mobile phone 104 due to the limited display screen size for mobile devices 102-106. Whereas a desktop computer user may view a large screen that lists many available selections, a mobile device user may view a smaller screen that lists only a few available selections on a page at one time. Viewing other portions of a partially displayed page or navigating to other pages for more selections may require additional user inputs and more time. The modified order of access and the navigation elements may enable a user of the new mobile device 104 to provide fewer user inputs to access a resource via the new mobile device 104 than required to access the resource via the previous mobile device 102. For example, the modified order of access and the navigation elements may enable a user of the new mobile device 104 to provide fewer user inputs to listen to music, watch television, conduct a search via a web site, communicate via voice mail, receive directions for navigating to a street address, etc. The personalizing engine 116 configuring the user's new mobile device 104 based on the profile 118 may enable the user to use features on the new mobile device 104 more efficiently, reduce the time required for the user to learn how to use the new features, reduce the user's frustration, and increase customer satisfaction.

In yet another example, the personalizing engine 116 configures a user interface to provide a user interface link that offers a selection of ring tones and/or user interface display backgrounds based on the demographic information included in the profile 118. The selection of ring tones offered by the user interface may include the most popular ring tones downloaded by males between the ages of 20 and 30 because the demographic information in the profile 118 indicates that the user of the new mobile device 104 is a 25 year old male. Additionally, the personalizing engine 116 may use the user's responses to survey questions, such as musical preferences, to determine which ring tones to offer for the new mobile device 104. Furthermore, the personalizing engine 116 may automatically reload and reconfigure previously loaded and configured ring tones, wallpaper, screen savers, etc.

In a further example, the personalizing engine 116 configures a user interface to add an option to view a weather web page based on the location of the new mobile device 104. In this example, the user traversed many web pages to view the weather web page for Florida weather when the previous mobile device 102 was located in New York, but never viewed the weather web page for New York weather when the previous mobile device 102 was in Florida. The user may not have added the option to more quickly view the weather web page for Florida on the previous mobile device 102 because the user was unaware of the capability to add this user interface link or because the previous mobile device 102 did not offer the capability to add this user interface link.

In an additional example, the personalizing engine 116 configures a user interface to map the most frequently called numbers that are listed in the user's address book to mobile device keys on the new mobile device 104 based on another profile built from user input associated with the third mobile device 106. In this example, other users with profiles that match the user's profile to a specified degree use speed dialing, whereas the user did not use the speed dialing feature on the previous mobile device 102. The user may not have used speed dialing on the previous mobile device 102 because the user was unaware of this feature or because the previous mobile device 102 did not offer this feature.

The personalizing engine 116 may communicate a message that provides an explanation for the added user interface link or the modified order of access to the user interface, whereby the user may be informed of the features offered by the new mobile device 104. Informing the user of configurations to the user interfaces on the new mobile device 104 that the previous mobile device 102 did not offer or of which the user was not aware may increase the user's satisfaction with the new mobile device 104.

After viewing the explanatory message, the user may have the option of declining the configuration of the new mobile device 104. If the user declines the configuration, the personalizing engine 116 reconfigures the user interface associated with the message. The new mobile device 104 may present a message for each configuration of the user interfaces, and the user may select whether or not to accept each configuration individually. The personalizing engine 116 may discontinue service for the previous mobile device 102 and establish service for the new mobile device 104 at some point during the personalization process.

Though illustrated as a mobile phone, the mobile devices 102-106 may take various forms including a personal digital assistant (PDA), a mobile telecommunication device, a telephone, a mobile handset, a handheld gaming device, a wireless mobile device, and a pager. Suitable mobile devices may combine some or all of these functions. The mobile devices 102-106 may communicate by a radio access network providing access to the communication network 110. The server 112 is connected to the communication network 110. The mobile devices 102-106 communicate with the server 112 via the radio access network and the communication network 110. Other communication paths may also be used.

Figure 3:
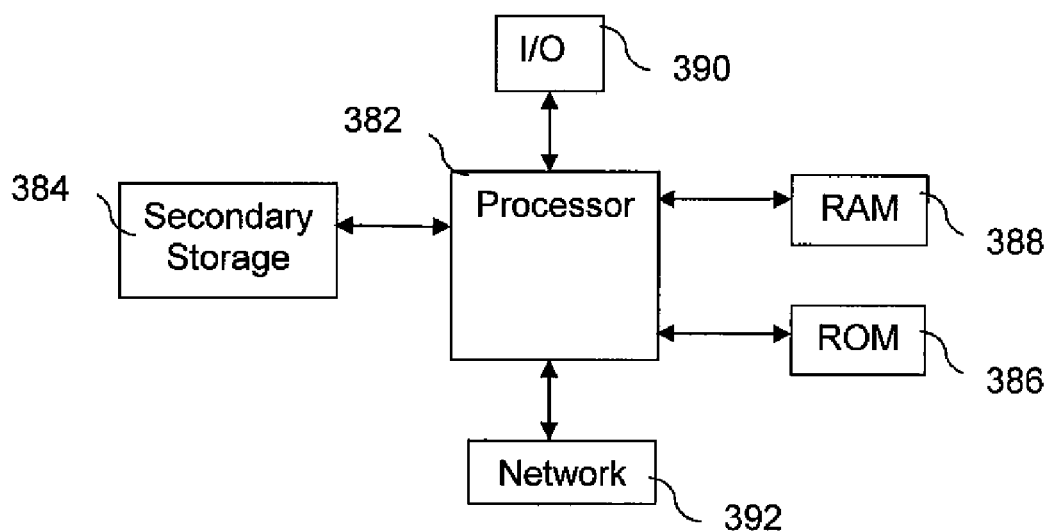
FIG. 3 illustrates an exemplary computer system suitable for implementing the several embodiments of the disclosure.

The server 112 may be implemented on a computer, which is discussed below in reference to FIG. 3. The personalizing engine 116 may be implemented as a software program. The number and the types of mobile devices, base transceiver stations, networks, servers, personalizing engines, data stores, and profiles in FIG. 1 are exemplary.

Figure 2:
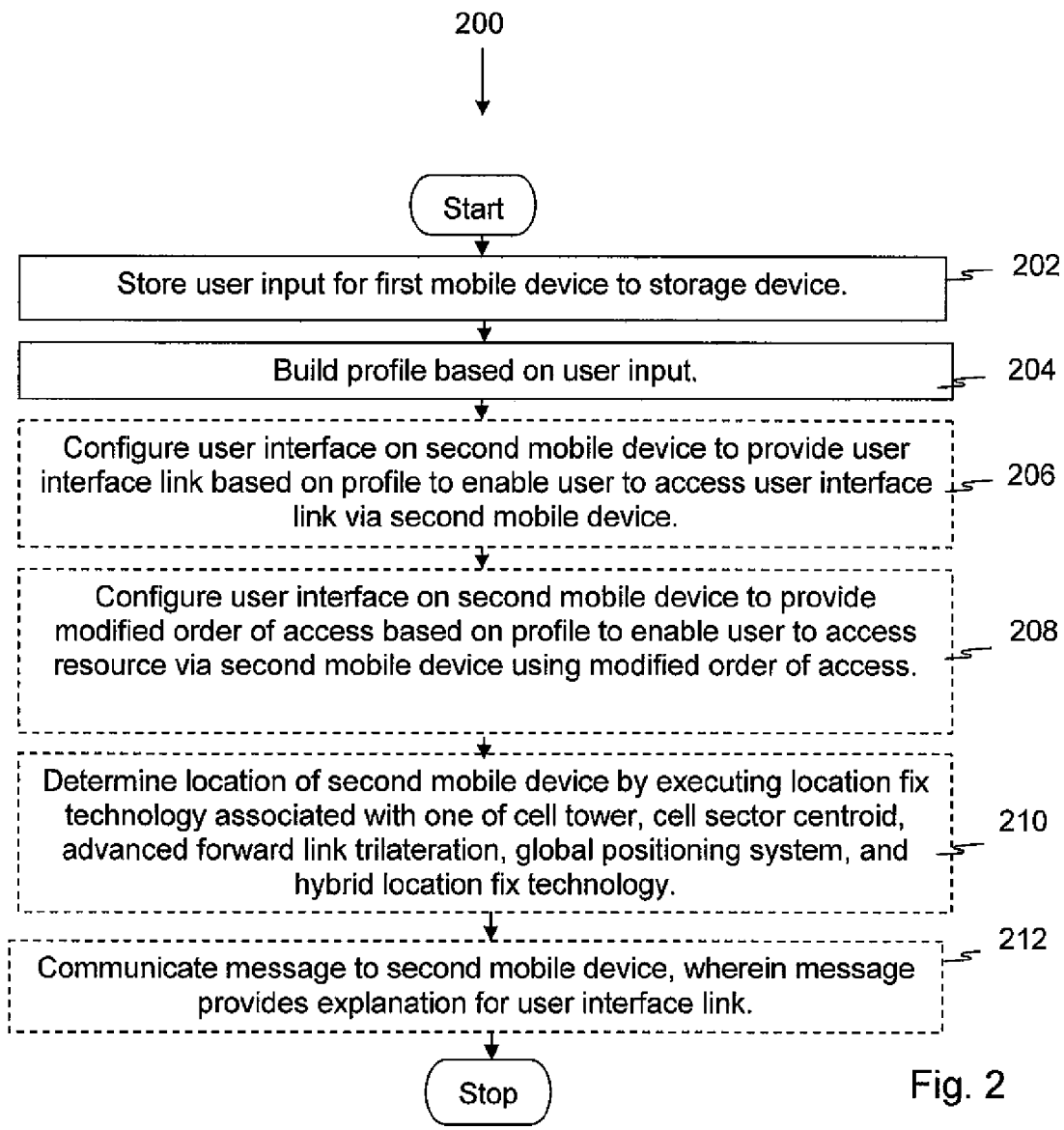
FIG. 2 is a flowchart of a method for personalizing new mobile devices based on previous mobile device usage according to some embodiments of the present disclosure.

FIG. 2 shows a flowchart of a method 200 for personalizing new mobile devices based on previous mobile device usage according to some embodiments of the present disclosure. The system 100 can execute the method 200 to configure user interfaces for the new mobile device 104 based on user input for the previous mobile device 102 to enable more efficient use of the new mobile device 104.

In box 202, user input for a first mobile device is stored to a storage device. For example, the personalizing engine 116 stores user input to select the user's favorite video game.

In box 204, a profile is built based on user input. For example, the personalizing engine 116 builds the profile 118 based on the selection of the user's favorite video game.

In box 206, a user interface on a second mobile device is optionally configured to provide a user interface link based on the profile to enable a user to access the user interface link via the second mobile device. For example, the personalizing engine 116 configures a user interface on the new mobile device 104 to provide a user interface link to access the user's favorite video games.

In box 208, a user interface on the second mobile device is optionally configured to provide a modified order of access based on the profile to enable the user to access a resource via the second mobile device using the modified order of access. For example, the personalizing engine 116 configures a user interface on the new mobile device 104 to provide a modified order of access for the game selection page.

In box 210, a location of the second mobile device is optionally determined by executing a location fix technology associated with one of a cell tower, a cell sector centroid, an advanced forward link trilateration, a global positioning system, and a hybrid location fix technology. For example, the personalizing engine 116 determines that the location of the new mobile device 104 is in Florida by executing a global positioning system technology.

In box 212, a message is optionally communicated to the second mobile device, wherein the message provides an explanation for the user interface link. For example, the personalizing engine 116 communicates a message to the new mobile device 104 that explains the user interface link to the user's favorite video games.

Some aspects of the system described above, for example the server 112, may be implemented on a computer with sufficient processing power, memory resources, and network throughput capability to handle the necessary workload placed upon it. Other aspects of the system described above, for example the mobile devices 102, 104, 106, may be implemented as a special purpose computer, for example as a PDA, a mobile telecommunication device, a telephone, a mobile handset, a handheld gaming device, a wireless mobile device, and a pager. FIG. 3 illustrates a typical computer system. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for personalizing new mobile devices based on previous mobile device usage, comprising:
   a storage device;
   a processor;
   a personalizing engine, when executed by the processor,
      to store user input for a first mobile device to the storage device that indicates which functions were used on the first mobile device, how often the functions were used, and screen paths used to select the functions,
      to build a profile based on the user input, and
      to configure a user interface on a second mobile device to provide a user interface link based on the profile to enable a user to access the user interface link via the second mobile device, wherein the user interface link comprises a selectable option on a first web page that displays a second web page when selected or an added option on a list of displayed options that enables a user to select an option from a portion of the list that is not currently displayed, and wherein the user interface link on the second mobile device was not present on the first mobile device.

2. The system of claim 1, wherein at least one of the first mobile device and the second mobile device is one of a mobile telecommunication device, a mobile handset, a personal digital assistant, a handheld gaming device, a wireless mobile device, and a pager.

3. The system of claim 1, wherein the user input is associated with at least one of a subscription, a purchase, a text message, an e-mail, content downloaded, a response to an advertisement, a time associated with the request for the resource, a social circle selected, and a social circle communication, and wherein the functions comprise a plurality of listening to music, watching television, setting an alarm, conducting a web search, communicating via voice mail, tracking a stock price quote, recording voice memos, receiving weather forecasts, and receiving navigation directions.

4. The system of claim 1, wherein the profile is further based on at least one of a user request made via the first mobile device and demographic information associated with a mobile device user.

5. The system of claim 4, wherein the demographic information comprises at least one of a customer service bill, a credit report, an income level, an education level, an occupation, and credit card information.

6. The system of claim 1, wherein the user interface link provides a selection of at least one of ring tones and user interface display backgrounds to the user of the second mobile device based on the profile.

7. The system of claim 1, wherein the user interface link is further based on another profile built from user input associated with another mobile device, wherein the other profile is associated with the profile based on a predetermined level of matching.

8. The system of claim 1, wherein the personalizing engine communicates via a base transceiver station and via a communication network to communicate with the first mobile device via "over the air" messaging.

9. A computer implemented method for personalizing new mobile devices based on previous mobile device usage, comprising:
   storing user input for a first mobile device to a storage device that indicates which functions were used on the first mobile device, how often the functions were used, and screen paths used to select the functions;
   building a profile based on the user input; and
   configuring a user interface on a second mobile device to provide a user interface link based on the profile to enable a user to access the user interface link via the second mobile device, wherein the user interface link comprises a selectable option on a first web page that displays a second web page when selected or an added option on a list of displayed options that enables a user to select an option from a portion of the list that is not currently displayed, and wherein the user interface link on the second mobile device was not present on the first mobile device.

10. The computer implemented method of claim 9, wherein the profile is further based on a location associated with the second mobile device.

11. The computer implemented method of claim 10, further comprising determining the location of the second mobile device by executing a location fix technology associated with one of a cell tower, a cell sector centroid, an advanced forward link trilateration, a global positioning system, and a hybrid location fix technology.

12. The computer implemented method of claim 10, wherein the location of the second mobile device is based on a mailing address specified for a customer service bill.

13. The computer implemented method of claim 9, wherein the user interface link comprises a uniform resource locator for a resource accessed by a web browser or a navigation element in a document that enables navigation to one of a section of the document and another section of another document.

14. The computer implemented method of claim 9, further comprising communicating a message to the user interface, wherein the message provides an explanation for the user interface link.

15. A system for personalizing new mobile devices based on previous mobile device usage, comprising:
   a storage device;
   a processor;
   a personalizing engine, when executed by the processor, to store user input for a first mobile device to the storage device that indicates which functions were used on the first mobile device, how often the functions were used, and screen paths used to select the functions, to build a profile based on the user input, and to configure a user interface on a second mobile device to provide a modified order of access based on the profile to enable a user to access a resource, which did not exist on the first mobile device, using the modified order of access via the second mobile device.

16. The system of claim 15, wherein the modified order of access enables the second mobile device to display selections of user input to access a resource via the second mobile device in an order based on a frequency of accessing the resource via the first mobile device.

17. The system of claim 15, wherein the personalizing engine discontinues service for the first mobile device and establishes communication for the second mobile device.

* * * * *